United States Patent Office 2,799,533
Patented July 16, 1957

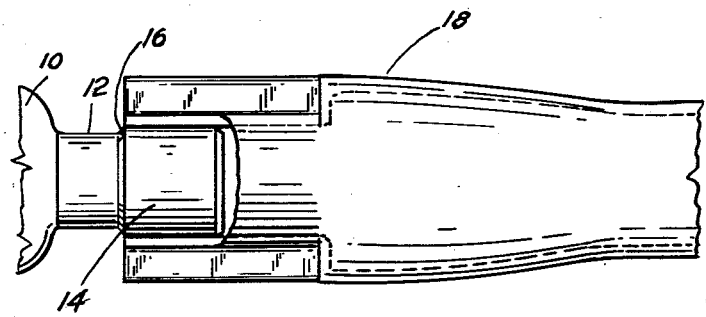
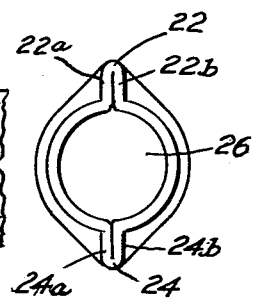
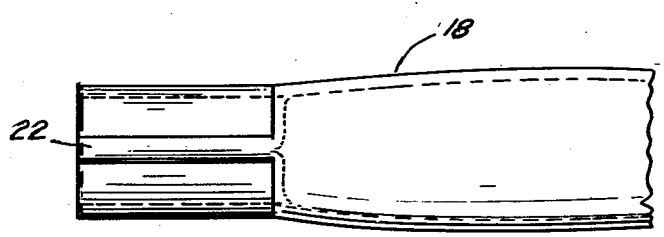
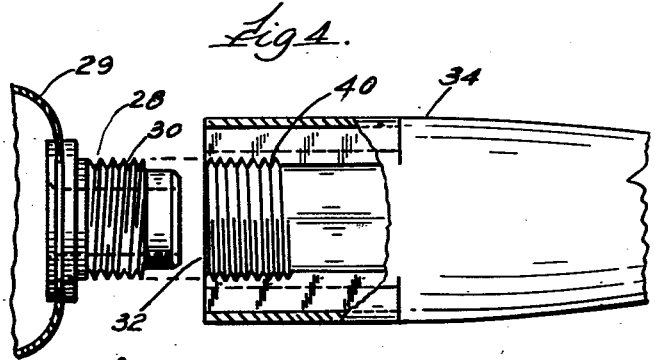
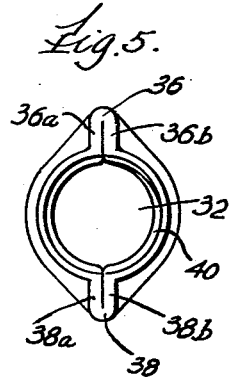
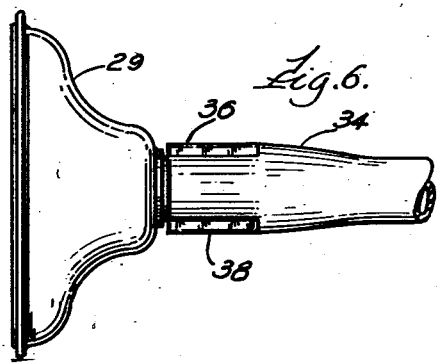
INVENTORS
HERMAN BACHLI and
HARRY S. SHAPIRO

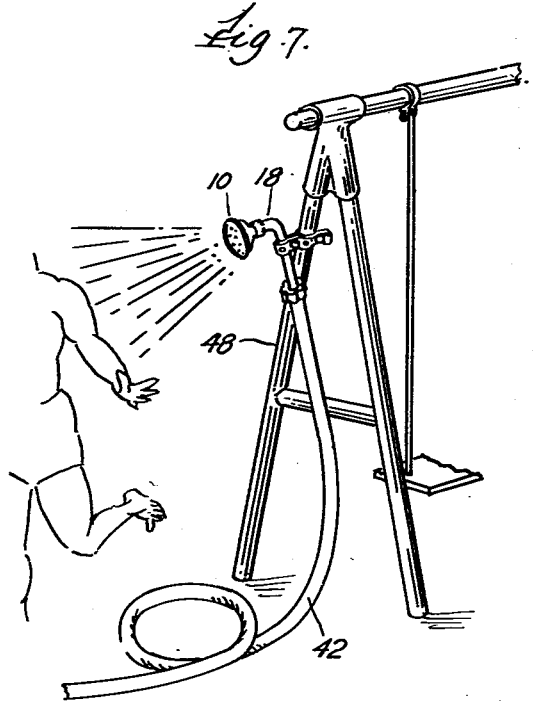
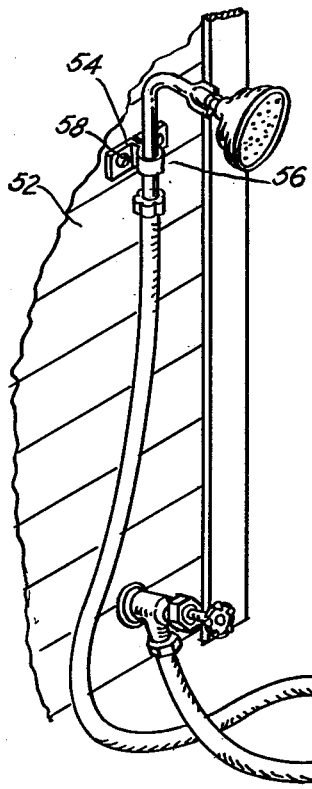
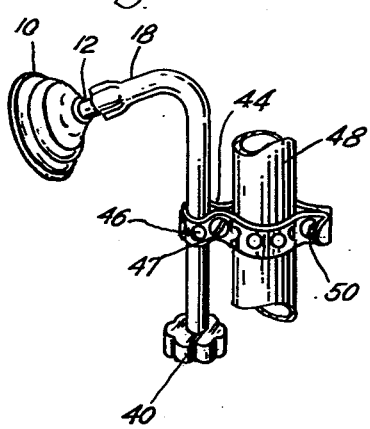

2,799,533

SHOWER HEAD WITH FRICTIONAL GRIP COUPLING MEANS FOR ATTACHMENT TO TUBULAR CONDUITS

Herman Bachli and Harry S. Shapiro, Chicago, Ill., assignors to Chicago Specialty Manufacturing Co., Chicago, Ill., a corporation of Illinois Application March 30, 1954, Serial No. 419,704

1 Claim. (Cl. 299—73)

This invention relates to improved means for attaching nozzles to tubular conduits.

One of the objects of this invention is to provide an improved means for securing a nozzle to a tubular metal conduit, wherein the tubular conduit is crimped at the end thereof to reduce the bore thereof so that it may accommodate the neck of the nozzle or spray head.

Another object is to provide a very simple, easy and inexpensive construction whereby the mouth of a tubular member or conduit is reduced in circumference to accommodate and retain the neck of an attachment such as a nozzle having a smaller circumference.

Other objects will become apparent as this description progresses.

In the drawings:

Fig. 1 is a side elevational view, partially broken away, showing the manner of securing the tubular conduit formed in accordance with this invention to a nozzle or spray.

Fig. 2 is an end view of the tubular conduit.

Fig. 3 is a top plan view of the same.

Fig. 4 is an exploded view partly in cross section showing a modified embodiment in which internal threads are provided in the tubular member to threadingly receive the neck of a shower head complementally threaded.

Fig. 5 is an end view of the tubular conduit shown in Fig. 4.

Fig. 6 is a side view showing the parts in assembled relation.

Fig. 7 is a perspective view showing one manner of attaching this invention to playground equipment.

Fig. 8 is an enlarged view of a portion of Fig. 7, and

Fig. 9 is a perspective view showing the invention attached to the side of a building.

Referring to the construction shown in Figs. 1 to 3 inclusive, the nozzle or shower head generally indicated at 10 has a neck or extension 12. The circumference of the neck is slightly enlarged as at 14 to define a shoulder 16.

The connecting tubular metal conduit to which the spray head structure is secured is generally indicated at 18. The mouth portion of the conduit is formed in accordance with this invention to provide a reduced bore smaller than the bore of the rest of the conduit. The neck 12 of the nozzle is then secured to the mouth portion.

The tubular wall of the mouth portion is compressed or crimped at diametrically opposed portions to form a pair of opposed ribs 22 and 24 and a reduced tubular conduit mouth portion 26. The ribs 22 and 24 are each formed with two outwardly extending abutting walls 22a, 22b and 24a, 24b reversely bent as shown.

The reduced mouth portion 26 of the conduit thus formed is adapted to receive and frictionally retain the neck 12 of the shower head 10 against inadvertent or accidental dislodgement. The reversely bent walls 22a, 22b and 24a, 24b of the ribs 22 or 24 respectively serve as tension means and will spread slightly under pressure from the neck of the shower head to frictionally grip the shower head.

Figs. 4, 5 and 6 show a modified construction. In this construction the neck 28 of the shower head 29 is threaded as at 30 and is adapted to be threadingly received in the mouth portion 32 of the conduit 34. The mouth portion 32 of conduit 34 is formed similarly to that described in connection with that shown in Figs. 1 to 3, and has opposed ribs 36 and 38, each formed with two outwardly extending abutting walls 36a, 36b and 38a, 38b reversely bent as shown. In addition the interior of the mouth portion is threaded as at 40 to receive the threaded neck 30.

The tubular metal conduit 18 (or 34) is substantially of inverted L shape (Figs. 7–9) and has secured at its opposite end the usual coupling member 40 which is internally threaded and to which is secured the hose 42 which is connected to a source of water supply. Figures 7 and 8 show one form of means for attaching the tubular conduit 18 (or 34) to playground equipment. A flexible metal strap 44 provided with spaced openings 46 is wrapped around the conduit and held together by a bolt and nut 47. The other portion of the strap is wrapped around the post 48 of the playground equipment and held thereon by a bolt and nut 50.

Fig. 9 shows the construction secured to the side of a building 52. A metal strap 54 similar to strap 44 is wrapped around the conduit 18 (or 34) as at 56 and is held together by a suitable bolt and nut. The strap extends rearwardly and is bent at right angles thereto and is secured to the building wall as at 58. Other types of fastening means may be used in lieu of those shown.

It will be understood that various changes and modifications may be made from the foregoing without departing from the spirit and scope of the appended claim.

We claim:

In combination a shower head having a neck, an inverted L-shaped tubular conduit, a flexible pipe connected at one end to said tubular conduit to permit the passage of water therethrough, said tubular conduit having a mouth at its opposite end, said mouth being crimped to define a pair of diametrically opposite ribs, each rib formed by reversely bent substantially abutting walls extending outwardly of the mouth to define a circumference smaller than the tubular conduit and to provide tension means, said neck of said shower head being secured in said mouth and adapted to spread said reversely bent walls under tension to frictionally retain said neck in said tubular conduit and in fluid tight relationship therewith, and clamping means secured to said tubular conduit and to a supporting surface to support said shower head above a floor surface.

References Cited in the file of this patent

UNITED STATES PATENTS

| | | |
|---|---|---|
| 1,431,691 | Schroder | Oct. 10, 1922 |
| 1,777,120 | Lewin | Sept. 30, 1930 |
| 2,173,693 | Nilson | Sept. 19, 1939 |
| 2,279,388 | Cox | Apr. 14, 1942 |

FOREIGN PATENTS

| | | |
|---|---|---|
| 437,024 | Germany | Mar. 25, 1925 |
| 371,727 | Italy | Mar. 9, 1939 |